United States Patent [19]
Toma et al.

[11] Patent Number: 6,155,102
[45] Date of Patent: Dec. 5, 2000

[54] METHOD AND APPARATUS FOR USE IN DETERMINING A PROPERTY OF A MULTIPHASE FLUID

[75] Inventors: Peter Toma; Rodney K. Ridley, both of Edmonton, Canada

[73] Assignee: Alberta Research Council, Alberta, Canada

[21] Appl. No.: 09/129,810

[22] Filed: Aug. 6, 1998

[51] Int. Cl.[7] .............................. G01N 33/20; G01F 1/74
[52] U.S. Cl. ........................ 73/61.44; 73/861.04; 434/46
[58] Field of Search .............................. 73/61.44, 861.04, 73/152.02; 364/578, 422, 510

[56] References Cited

U.S. PATENT DOCUMENTS

| | | |
|---|---|---|
| 3,834,227 | 9/1974 | Patterson et al. . |
| 3,926,050 | 12/1975 | Turner et al. . |
| 4,144,754 | 3/1979 | Pitts, Jr. et al. . |
| 4,261,196 | 4/1981 | Scheid, Jr. . |
| 4,282,760 | 8/1981 | Pitts, Jr. et al. . |
| 4,300,399 | 11/1981 | Kuijpers et al. . |
| 4,347,747 | 9/1982 | Srinivasan . |
| 4,417,474 | 11/1983 | Elderton . |
| 4,453,415 | 6/1984 | Carter . |
| 4,513,625 | 4/1985 | Campman et al. . |
| 4,569,232 | 2/1986 | Kim . |
| 4,612,814 | 9/1986 | Campman . |
| 4,677,859 | 7/1987 | Chinery . |
| 5,004,152 | 4/1991 | Baker et al. . |
| 5,036,712 | 8/1991 | Lew . |
| 5,051,922 | 9/1991 | Toral et al. . |
| 5,550,761 | 8/1996 | Pauchon et al. .......................... 364/578 |
| 5,586,027 | 12/1996 | Carlson et al. .......................... 364/422 |
| 5,591,922 | 1/1997 | Segeral et al. . |
| 5,600,073 | 2/1997 | Hill ...................................... 73/861.04 |
| 5,608,170 | 3/1997 | Atkinson et al. . |
| 5,641,915 | 6/1997 | Ortiz et al. . |

FOREIGN PATENT DOCUMENTS

WO95/33980  12/1995  WIPO .

OTHER PUBLICATIONS

PCT International Search Report, Jan. 12, 2000.
Kistler Instrument Corporation Data Bulletin K3.211B entitled "Series 211B Piezotron miniature acceleration–compensated pressure transducers" dated Jun. 1986. (2 pages).
Vince M.A. and Lahey, Jr. R.T., "On the Development of an Objective Flow Regime Indicator," *Int. J. Multiphase Flow* vol. 8, No. 2, 1982, pp. 93–124.
Darwich, T.D.A., "A Statistical Method for Two–Phase Flow Metering," Imperial College of Science, Technology and Medicine, University of London, Jan. 1989, pp. 27–57.
Beg N.A. and Toral H., "Off–Site Calibration of a Two–Phase Pattern Recognition Flowmeter," *Int. J. Multiphase Flow* vol. 19, No. 6, Aug. 1993, pp. 999–1012.
Gopal M. and Jepson W.P., "Development of Digital Image Analysis Techniques for the Study of Velocity and Void Profiles in Slug Flow," *Int. J. Multiphase Flow* vol. 23, No. 5, Mar. 1997, pp. 945–954, 962–965.

(List continued on next page.)

*Primary Examiner*—Hezron Williams
*Assistant Examiner*—Jay L. Politzer
*Attorney, Agent, or Firm*—Rodman & Rodman

[57] ABSTRACT

A method and an apparatus for determining at least one property of a multiphase fluid. The method includes the steps of directing the multiphase fluid through a first flow passage, monitoring the multiphase fluid as it passes through the first flow passage to obtain a first signal representing a first flow characteristic of the multiphase fluid as a function of time, directing the multiphase fluid through a second flow passage, monitoring the multiphase fluid as it passes through the second flow passage to obtain a second signal representing a second flow characteristic of the multiphase fluid as a function of time, and then determining the property of the multiphase fluid by comparing the first signal and the second signal with a set of calibration maps. The second flow passage has a geometry different from the first flow passage which relates either to the cross section of the two flow passages or to the direction in which the multiphase fluid passes through the flow passages relative to gravity.

26 Claims, 10 Drawing Sheets

OTHER PUBLICATIONS

"Expert System for Multi–phase Flow Metering," *ESMER Newsletter* Issue 1 dated Aug., 1997, pp. 1–4.

Hong K.C. and Griston S., "Best Practice for the Distribution and Metering of Two–Phase Steam," *SPE Production & Facilities* Aug. 1997, pp. 173–180.

METHOD AND APPARATUS FOR USE IN DETERMINING A PROPERTY OF A MULTIPHASE FLUID

TECHNICAL FIELD

The present invention relates to a method and an apparatus for use in determining at least one property of a multiphase fluid.

BACKGROUND OF THE INVENTION

A multiphase fluid is a fluid having more than one phase, such as a fluid having two or more liquid phases or a combination of a gas phase with one or more liquid phases.

Multiphase fluids are frequently encountered in industry and it is often necessary or desirable to have the ability to determine their properties. For example, in the oil and gas industry, multiphase fluids are very common and it is often important to know the respective proportions or flowrates of the various phases, which typically may include a gas phase, a water phase and an oil phase.

Unfortunately, however, determining the properties and real boundaries of a multiphase fluid can be difficult for a variety of reasons. For example, there are many different flow regimes which are possible for multiphase fluids, making modelling of multiphase flow difficult. These flow regimes manifest themselves in different phase patterns which depend upon the composition and flowrate of the multiphase fluid.

Multiphase fluids can exhibit a multitude of these phase patterns and are prone to slippage between the various phases. Where a multiphase fluid contains more than one liquid phase, separate slugs or plugs of the different liquid phases may be dispersed unevenly throughout the flow. Where a multiphase fluid contains a gas phase, the gas may take the form of small bubbles, large slugs or even a discrete layer of gas above the liquid phase or phases. These phenomena are due in part to the effects of viscosity, gravity, inertia and interfacial friction and affect the ability to obtain reliable and consistent measurements of the properties of multiphase fluids when single phase fluid measurement apparatus and techniques are used.

As a result, there are three conventional approaches to determining the properties of multiphase fluids. The first approach involves separating the multiphase fluid into its component phases and then measuring the component phases separately using single phase measurement methods and devices. The second approach involves creating a pseudo single phase fluid by mixing the multiphase fluid to produce a homogeneous mixture which is then measured using single phase measurement methods and devices. The third approach involves methods and devices which are specifically designed for use in determining the properties of multiphase fluids. Each of these approaches has its drawbacks.

The first approach requires that the flow of the multiphase fluid be interrupted and diverted so that the multiphase fluid can be sampled and then separated for measurement. Due to the effects of different flow regimes and phase patterns, there is also a risk that the sample of multiphase fluid that is taken will not be representative of the multiphase fluid generally.

The second approach requires that the multiphase fluid be homogeneous at the time of measurement so that it will behave like a single phase fluid. Due to the tendency of multiphase fluids to segregate into phases, it is difficult to ensure the homogeneity of the multiphase fluid, particularly if the mixing must be interrupted to facilitate measurement. The second approach is also relatively inefficient due to the energy required to mix the multiphase fluid, which can result in the multiphase fluid experiencing a significant pressure drop during measurement.

The third approach potentially offers the most reliable determination of the properties of a multiphase fluid, but methods and devices based on this approach tend to be quite complex in order to take into account the effects of the many possible flow regimes, phase patterns and slippage of phases.

Some of these methods and devices utilize conventional principles of fluid mechanics and involve the direct application of either or both of Bernoulli's equation and the momentum equation to determine the properties of a multiphase fluid. Bernoulli's equation is useful for determining mass flowrate as a function of pressure change experienced by a fluid in response to a change in its velocity, while the momentum equation is useful for determining mass flowrate as a function of force exerted by a fluid in response to a change in its direction of flow.

For example, some efforts have used Bernoulli's equation to determine the mass flowrate of a multiphase fluid by measuring pressure differentials between different locations in a conduit (U.S. Pat. No. 3,926,050 (Turner et al); U.S. Pat. No. 4,144,754 (Pitts et al); U.S. Pat. No. 4,261,196 (Scheid); U.S. Pat. No. 4,282,760 (Pitts et al); U.S. Pat. No. 4,417,474 (Elderton); U.S. Pat. No. 4,453,415 (Carter); U.S. Pat. No. 5,591,922 (Segeral et al); U.S. Pat. No. 5,608,170 (Atkinson et al); U.S. Pat. No. 5,641,915 (Ortiz et al) and PCT International Publication No. WO 95/33980 (Kolpak et al)).

Other efforts have focused upon the application of the momentum equation to determine the mass flowrate of a multiphase fluid by measuring reaction forces exhibited by multiphase fluids as they encounter bends in a conduit (U.S. Pat. No. 4,513,625 (Campman et al); U.S. Pat. No. 4,569,232 (Kim); U.S. Pat. No. 4,612,814 (Campman); U.S. Pat. No. 4,677,859 (Chinery)).

A multiphase fluid cannot, however, be characterized completely by its mass flowrate, which is the product of volumetric flowrate multiplied by the density of the fluid. For example, the determination of volumetric flowrate requires knowledge of both the mass flowrate and density of the multiphase fluid and determination of density requires knowledge of both the mass flowrate and the volumetric flowrate of the multiphase fluid.

Consequently, measurements of pressure differentials or reaction forces are typically supplemented with at least one other measurement so that the multiphase fluid can be characterized completely (U.S. Pat. No. 3,926,050 (Turner et al); U.S. Pat. No. 4,144,754 (Pitts et al); U.S. Pat. No. 4,261,196 (Scheid); U.S. Pat. No. 4,282,760 (Pitts et al); U.S. Pat. No. 4,417,474 (Elderton); U.S. Pat. No. 4,513,625 (Campman); U.S. Pat. No. 4,569,232 (Kim); U.S. Pat. No. 4,612,814 (Campman); U.S. Pat. No. 4,677,859 (Chinery); U.S. Pat. No. 5,036,712 (Lew); U.S. Pat. No. 5,591,922 (Segeral); U.S. Pat. No. 5,608,170 (Atkinson et al); PCT International Publication No. WO 95/33980 (Kolpak)). In some cases, two different pressure differential measurements are used to characterize the multiphase fluid flow (U.S. Pat. No. 3,926,050 (Turner); U.S. Pat. No. 4,417,474 (Elderton); U.S. Pat. No. 5,591,922 (Segeral et al)).

As a result, multiphase fluid flow characterization methods and devices which involve the application of fluid mechanics equations such as Bernoulli's equation or the momentum equation share for the most part several common disadvantages. First, more than one measurement of the multiphase fluid is necessary in order to characterize the multiphase fluid completely. Second, the data obtained through measurement must be input into the equations in order to determine values for the properties of the multiphase fluid, thus necessitating the use of relatively complex data processing equipment in conjunction with such methods and devices. Third, these methods and devices may be somewhat prone to unreliable results, since they are based upon two or more independent and discrete measurements each of which includes its own range of error. Finally, those methods and devices which rely upon the measurement of one or more pressure differentials tend to be relatively inefficient due to the flow disruption that must be created to provide a measurable pressure differential between two points and due to different phase patterns which may be exhibited at the two points.

There have as a result been some attempts in the art to develop methods and devices for characterizing multiphase fluids which are less dependent upon the direct application of fluid mechanics equations.

U.S. Pat. No. 4,300,399 (Kuijpers et al) describes a method for determining individual flowrates of phases of a multiphase fluid which involves measuring for a time interval a pressure differential between two locations in a pipe bend, calculating both an average value for the pressure differential and an RMS value for the pressure differential, and then comparing the average value and the RMS value with predetermined reference data in order to determine the individual flowrates of the phases.

U.S. Pat. No. 5,051,922 (Toral) describes a method for determining individual flowrates of phases of a multiphase fluid which involves measuring for a time interval one or more flow related characteristics of a multiphase fluid (such as absolute pressure, differential pressure or void fraction), deriving from the measurements a plurality of parameters, comparing each of the parameters with a corresponding calibration map which relates that parameter to a range of possible flowrates for the individual phases, and then determining a value for the individual flowrates which is uniquely related to all of the parameters.

The inventions described in Kuijpers and Toral have some similarities. First, both utilize the measurement of one or more selected flow characteristics as a function of time to derive a set of parameters that can be used to characterize the multiphase fluid flow. Second, both apply statistical analysis techniques to measured flow characteristics instead of fluid mechanics equations in order to characterize multiphase fluid flow. Third, both appear to facilitate the determination of composition of a multiphase fluid without first determining mass flowrate.

Neither Kuijpers nor Toral, however, address directly the problems resulting from varying flow regimes, phase patterns and slippage which are associated with multiphase fluids. In particular, neither Kuijpers nor Toral allow for discrepancies in characterization which may occur due to the orientation of the multiphase fluid flow relative to gravity, since they both teach the measurement of flow characteristics in only one orientation relative to gravity. Since multiphase fluids behave differently depending upon the effects of both flow geometry and of orientation relative to gravity, measurements taken in only one orientation omit important information relating to variations in phase pattern which can be obtained through measurements taken in more than one orientation relative to gravity.

Problems resulting from varying flow regimes, phase patterns and slippage in relation to multiphase fluids have to some extent been recognized and addressed in the prior art.

U.S. Pat. No. 4,417,474 (Elderton) teaches a densitometer in which separate differential pressure measurements are made in horizontal and vertical portions of a pipeline and the difference between the two measurements is used to determine the density or specific gravity of the multiphase fluid.

U.S. Pat. No. 5,608,170 (Atkinson) teaches a method for determining the composition and flowrate of a multiphase fluid by making separate differential pressure measurements in a first flow passage and a second flow passage, wherein the second flow passage has a "different geometry" than the first flow passage. The "different geometry" referred to in Atkinson is defined in terms of either the area of the flow passages or the direction of flow relative to gravity.

Both Elderton and Atkinson apply fluid mechanics equations to the differential pressure measurements in order to arrive at the characterization of the multiphase fluid flow.

There is therefore a need for a method and apparatus for use in characterizing multiphase fluid flow which is not entirely dependent upon the application of fluid mechanics equations and which addresses the issues of flow regime, phase pattern and slippage as they apply to multiphase fluids. There is also a need for such a method and apparatus which is relatively simple to construct and use and which does not require significant disruption of the multiphase fluid flow or result in the multiphase fluid experiencing significant pressure drop during measurement.

SUMMARY OF THE INVENTION

The present invention relates to a method and an apparatus for use in determining at least one property of a fluid by comparing a first signal and a second signal with a set of calibration maps, wherein the first signal and the second signal are related to the flow of the fluid as it passes through two flow passages which have different geometries, either in terms of their cross sections or in terms of their direction of flow relative to gravity. The invention is best suited for use in determining a property of a multiphase fluid, but may be used to determine a property of a single phase fluid as well.

In a method form, the invention is a method for determining at least one property of a multiphase fluid comprising the steps of directing the multiphase fluid through a first flow passage, monitoring the multiphase fluid as it passes through the first flow passage to obtain a first signal representing a first flow characteristic of the multiphase fluid as a function of time, directing the multiphase fluid through a second flow passage, wherein the second flow passage has a geometry different from the first flow passage, monitoring the multiphase fluid as it passes through the second flow passage to obtain a second signal representing a second flow characteristic of the multiphase fluid as a function of time, and determining the property of the multiphase fluid by comparing the first signal and the second signal with a set of calibration maps.

The multiphase fluid is preferably monitored as it passes through the first flow passage by a first transducer and is preferably monitored as it passes through the second flow passage by a second transducer. The first transducer preferably generates a first signal and the second transducer preferably generates a second signal. The first signal is preferably a first electrical signal and the second signal is preferably a second electrical signal.

Any type of transducer capable of generating a signal representing a flow characteristic of the multiphase fluid may be used in the invention. Preferably the first flow characteristic is a variation in a first pressure, the first transducer is a first pressure transducer which is capable of monitoring the variation in the first pressure, and the first signal represents the variation in the first pressure as a function of time. Preferably the second flow characteristic is a variation in a second pressure, the second transducer is a second pressure transducer which is capable of monitoring the variation in the second pressure, and the second signal represents the variation in the second pressure as a function of time. The first pressure and the second pressure are preferably related to acceleration of the multiphase fluid as its flow changes direction.

The second flow passage has a geometry different from the first flow passage. This difference in geometry may relate to the cross section of the flow passages or it may relate to the direction in which the multiphase fluid passes through the flow passages relative to gravity. Preferably, the multiphase fluid passes through the first flow passage and passes through the second flow passage in different directions relative to gravity. Most preferably, the multiphase fluid passes through one of the first flow passage and the second flow passage in a substantially vertical direction and passes through the other of the first flow passage and the second flow passage in a substantially horizontal direction.

The first transducer preferably communicates with the first flow passage at a location in the first flow passage where the multiphase fluid changes direction. Preferably, the first flow passage terminates with a first elbow and the first transducer is positioned at the first elbow. Similarly, the second transducer preferably communicates with the second flow passage at a location in the second flow passage where the multiphase fluid changes direction and preferably the second flow passage terminates with a second elbow and the second transducer is positioned at the second elbow. Most preferably the first transducer and the second transducer are positioned at the first elbow and the second elbow respectively such that they monitor variations in the first pressure and the second pressure respectively which are associated with the acceleration of the multiphase fluid as it passes around the elbows.

The method may be used to determine a property of any single phase or multiphase fluid. Preferably, however, the multiphase fluid includes a gas phase and at least one liquid phase. Most preferably, the multiphase fluid is a two phase fluid comprising a gas phase and a liquid phase.

The method may be used to determine any property of a single phase or multiphase fluid, including density, specific gravity, volumetric flowrate, mass flowrate, and relative composition of the various phases of a multiphase fluid. Preferably, however, the method is used to determine the relative proportions of the phases present in a multiphase fluid. Most preferably, the method is used to determine the relative proportions of gas phase and liquid phase that are present in a two phase multiphase fluid.

In addition, because the second flow passage has a geometry different from the first flow passage, the method may also be useful for studying the phase pattern transition characteristics of a particular composition and flowrate of multiphase fluid, since the multiphase fluid will exhibit varying phase patterns as it moves between the first flow passage and the second flow passage and as its flowrate or other properties change.

Although the first signal and the second signal may be compared directly with the set of calibration maps to determine the property of the multiphase fluid, the method may further comprise the steps of deriving a value for a first parameter from the first signal and deriving a value for a second parameter from the second signal. The step of determining the property of the multiphase fluid may then comprise comparing the values of the first parameter and the second parameter with the set of calibration maps.

The parameters that may be derived from the first signal and the second signal may relate to any aspect of the signals. The parameters may be derived directly from the signals or they may be derived from the signals after the signals have been processed. The first and second signals may be processed in any manner to yield the first parameter and the second parameter respectively, and processing of the signals may or may not involve statistical analysis such as the creation of sets of data points from the signals and then developing probability density functions from the sets of data points. For example, the signals may be processed mathematically without first creating sets of data points such as by integrating the signals or by taking their derivatives, and the first parameter and the second parameter may then be obtained from the resulting integrals or derivatives. The signals may also be processed to eliminate noise and interference prior to derivation of the parameters therefrom.

Preferably, however, the step of deriving a value for a first parameter from the first signal comprises processing the first signal by the steps of creating a first set of data points from the first signal, developing a first probability density function of the first signal, and obtaining the value for the first parameter from the first probability density function. Similarly, the step of deriving a value for a second parameter from the second signal preferably comprises processing the second signal by the steps of creating a second set of data points from the second signal, developing a second probability density function of the second signal, and obtaining the value for the second parameter from the second probability density function.

A value for a third parameter may also be obtained from the first signal and the property of the multiphase fluid may then be determined by comparing the values of the first parameter, the second parameter and the third parameter with a set of calibration maps. A value for a fourth parameter may also be obtained from the second signal and the property of the multiphase fluid may then be determined by comparing the values of the first parameter, the second parameter, the third parameter and the fourth parameter with a set of calibration maps.

As with the first parameter and the second parameter, the third and fourth parameters may be derived from the first signal and the second signal respectively in any manner, but preferably they are derived from the first probability density function and the second probability density function respectively. There is no limit to the number of parameters that may be derived from the first signal and the second signal.

Parameters that may be derived directly from the signals or from probability density functions developed by processing the signals include but are not limited to the maximum probability density value in the probability density function, the value of the signal corresponding to a predetermined probability density, the corresponding difference in the value of the signal between two predetermined probability densities, minimum signal value, maximum signal value, mean signal value, median signal value, standard deviation of the probability density function, skewness of the probability density function, kurtosis of the probability density function, and momentums of the probability density function. In circumstances where the probability density function is a multi-modal distribution, the derivation of parameters preferably takes into consideration the characteristics of the multi-modal distribution.

Parameters that may be derived from other processing of the signals include those related to the frequency of the signals, such as linear prediction model parameters and cepstrum function parameters, as well as those which may be obtained from other mathematical processing of the signals.

In the preferred embodiment, the parameters are derived from a first probability density function of the first signal and a second probability density function of the second signal and are preferably selected from the group of parameters consisting of the maximum probability density value in the probability density function ($P_{max}$), the value of the signal corresponding to a predetermined probability densities ($X_{P1}$), and the corresponding difference in the value of the signal between two predetermined probability densities ($X_{P2}-X_{P1}$).

The set of calibration maps preferably comprises at least one map representing each signal as a function of the property of the multiphase fluid which is to be determined. Where the method includes the steps of deriving parameters from the signals, the set of calibration maps preferably comprises at least one map for each parameter as a function of the property of the multiphase fluid which is to be determined. The set of calibration maps may also comprise a set of graphs in which the property is expressed either as a function of the signal or of a parameter derived from the signal.

Where the set of calibration maps comprises a set of graphs, each calibration graph may further comprise a plot of the property as a function of a particular signal or a parameter derived from the signal for a single value of a second property of the multiphase fluid. There may be more than one plot on a calibration graph, with each such plot representing a different value of the second property. Preferably, the number of plots on a calibration map is maximized to assist in interpolating between plots. Any property of the multiphase fluid may be chosen for the second property.

Where the property to be determined is the relative proportions of gas phase and liquid phase contained in a multiphase fluid, the set of calibration maps may comprise at least one graph for each parameter. Each graph relating to a particular parameter may then further comprise a plot or plots of the gas to liquid ratio of the multiphase fluid as a function of the parameter, with each such plot relating to a single value of the second property of the multiphase fluid. Preferably, the second property is related to the flowrate of the multiphase fluid, and preferably is the volumetric flowrate of the multiphase fluid, the mass flowrate of the multiphase fluid, the superficial liquid velocity of the liquid phase, or the superficial gas velocity of the gas phase. Most preferably, the second property is the superficial liquid velocity of the liquid phase of the multiphase fluid and each graph preferably includes separate plots of the gas to liquid ratio of the multiphase fluid as a function of a particular parameter for different values of the superficial liquid velocity of the liquid phase of the multiphase fluid.

The step of determining the property of the multiphase fluid therefore involves finding a common value for three variables in each of the calibration maps in the set of calibration maps. The first variable is the value of the parameter, the second variable is the value of the second property, and the third variable is the value of the property to be determined.

For certain applications, improved accuracy in the method may be achieved by including in the calibration maps plots of the property as a function of a particular signal or a parameter derived from the signal for single values of one or more properties of the multiphase fluid in addition to the second property, such as a third property, a fourth property and so on. Any property of the multiphase fluid may be chosen for these additional properties, which may include those related to the pressure of the multiphase fluid, such as the absolute pressure of the gas phase, or those related to viscosity or interfacial tension of the multiphase fluid. In such circumstances, the step of determining the property of the multiphase fluid involves finding a common value for more than three variables in each of the calibration maps in the set of calibration maps, with the additional variables being the third property, the fourth property and so on.

The number of parameters to be used in the method is preferably minimized in order to simplify the performance of the method. Preferably, two through four parameters are used in the method. Most preferably, only two parameters are used. Similarly, the number of calibration maps that are used in the method is preferably minimized. Most preferably, one calibration map is provided for each parameter.

In an apparatus form, the invention is an apparatus for use in determining a property of a multiphase fluid comprising a first flow passage for the multiphase fluid, a first monitoring device in communication with the first flow passage for obtaining a first signal representing a first flow characteristic of the multiphase fluid as a function of time, a second flow passage for the multiphase fluid having a geometry different from the first flow passage, and a second monitoring device in communication with the second flow passage for obtaining a second signal representing a second flow characteristic of the multiphase fluid as a function of time.

The first monitoring device is preferably a first transducer and the second monitoring device is preferably a second transducer. The first transducer preferably generates a first signal and the second transducer preferably generates a second signal. The first signal is preferably a first electrical signal and the second signal is preferably a second electrical signal. Although any type of transducer capable of generating a signal representing a flow characteristic of the multiphase fluid may be used in the invention, the first transducer is preferably a first pressure transducer and the second transducer is preferably a second pressure transducer.

As in the method form of the invention, the second flow passage has a geometry different from the first flow passage. This difference in geometry may relate to the cross section of the flow passages or it may relate to the direction in which the multiphase fluid passes through the flow passages relative to gravity. Preferably, the first flow passage and the second flow passage are oriented so that the multiphase fluid passes through them in different directions relative to gravity. Most preferably, the first flow passage and the second flow passage are oriented so that the multiphase fluid passes through one of the first flow passage and the second flow passage in a substantially vertical direction and passes through the other of the first flow passage and the second flow passage in a substantially horizontal direction.

The first transducer may be located at any position which enables it to be in communication with the first flow passage. Preferably, the first flow passage has an entrance end and an exit end and the exit end of the first flow passage preferably comprises a first elbow for changing the direction of the multiphase fluid as it exits the first flow passage. The first transducer is then preferably located at the first elbow. The second transducer may be located at any position which enables it to be in communication with the second flow passage. Preferably, the second flow passage has an entrance end and an exit end and the exit end of the second flow passage preferably comprises a second elbow for changing the direction of the multiphase fluid as it exits the second flow passage. The second transducer is then preferably located at the second elbow. Both the first elbow and the second elbow are preferably ninety degree elbows.

The first flow passage may be connected to the second flow passage, preferably by either the first elbow or the second elbow. The apparatus may further comprise a third flow passage for the multiphase fluid, which third flow passage is preferably connected to either or both of the first flow passage and the second flow passage. Most preferably, the first flow passage, the second flow passage and the second flow passage are connected to each other by the first elbow and the second elbow to form a measuring loop. The first flow passage, the second flow passage and the third flow passage are all preferably closed conduits, and are preferably pipes.

In its apparatus form, the invention may further comprise means for processing the first signal to facilitate the derivation from the first signal of a first parameter and means for processing the second signal to facilitate the derivation from the second signal of a second parameter. The means for processing the first signal and the means for processing the second signal may comprise two separate means or one means, and may result in the creation of sets of data points from the first signal and the second signal. The apparatus may then further comprise means for processing the first set of data points to develop a first probability density function and means for processing the second set of data points to develop a second probability density function. The means for processing the first set of data points and the means for processing the second set of data points may comprise two separate means or one means. The means for processing the signals and the means for processing the data points may also be separate means or they may be the same or associated means. The means for processing may also comprise means for filtering the signals to eliminate noise and interference from the signals before the parameters are derived therefrom.

In its apparatus form, the invention may also comprise means for recording the first signal for further processing and means for recording the second signal for further processing. The means for recording may be separate means or one means. Furthermore, the means for recording may be associated with the means for processing.

BRIEF DESCRIPTION OF DRAWINGS

Embodiments of the invention will now be described with reference to the accompanying drawings, in which.

DETAILED DESCRIPTION

The present invention relates to a method and apparatus for use in determining a property of a multiphase fluid. In the preferred embodiment, the property to be determined is the relative proportions of gas phase and liquid phase present in a multiphase fluid, expressed in terms of the gas to liquid ratio of the multiphase fluid. The invention is ideally suited for use with two phase multiphase fluids, but may also be used with single phase fluids and multiphase fluids having more than two phases.

The invention is based upon an understanding of the flow behavior of multiphase fluids and the exploitation of this flow behavior by the application of phase pattern recognition techniques to varying flow characteristics exhibited by multiphase fluids under varying conditions. Specifically, by observing the phase patterns of a multiphase fluid under different flow conditions, a set of parameters can be developed which are unique to a particular composition and flowrate of multiphase fluid. As a result, the invention does not depend upon the direct application of fluid mechanics equations but is based upon observation and analysis of phase patterns and in the preferred embodiment, statistical analysis.

Figure 1:
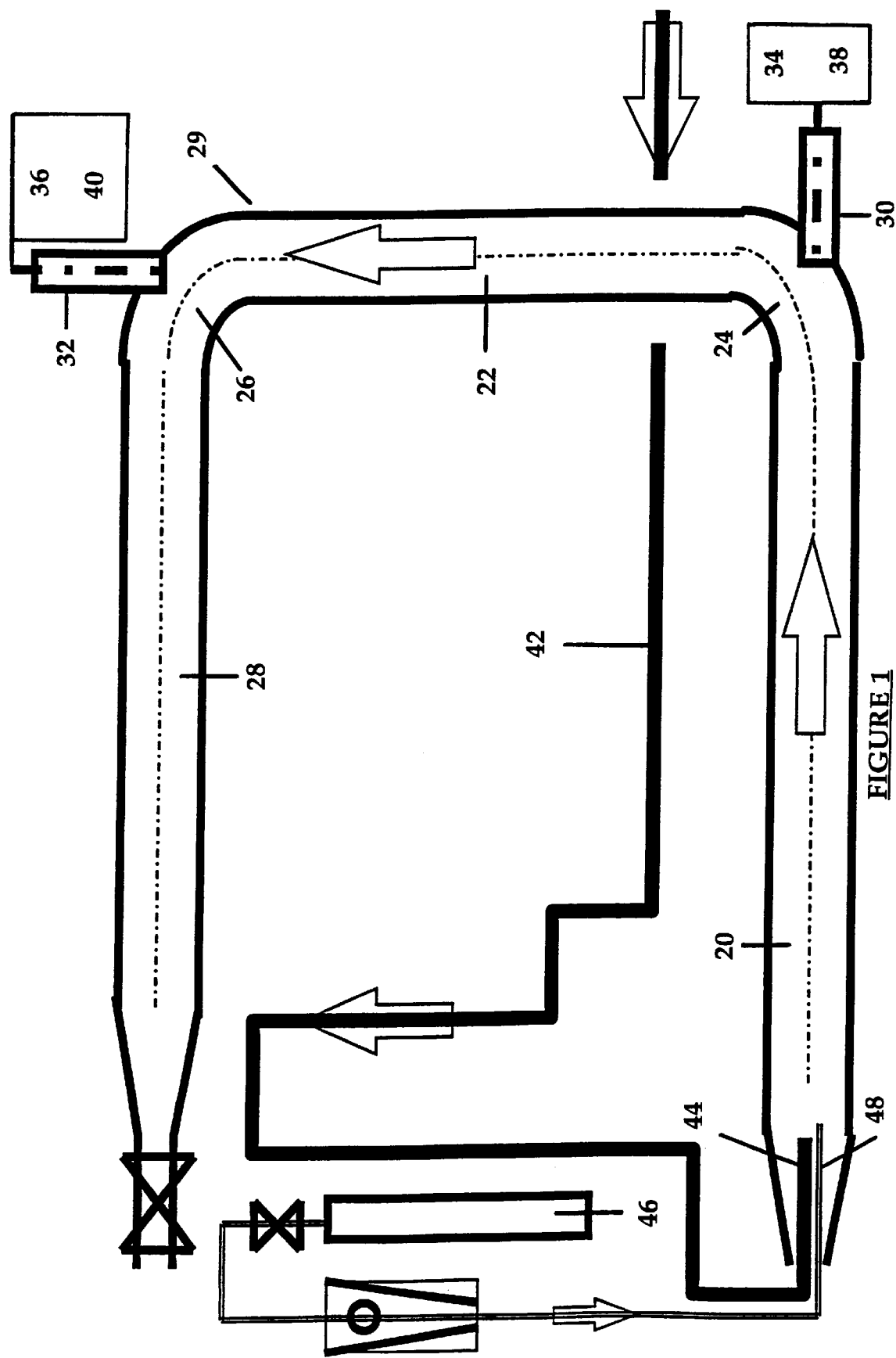
FIG. 1 is a schematic view of a measuring loop according to a preferred embodiment of the apparatus form of the invention, including apparatus for use in developing a set of calibration maps for use in the invention.
Figure 2:
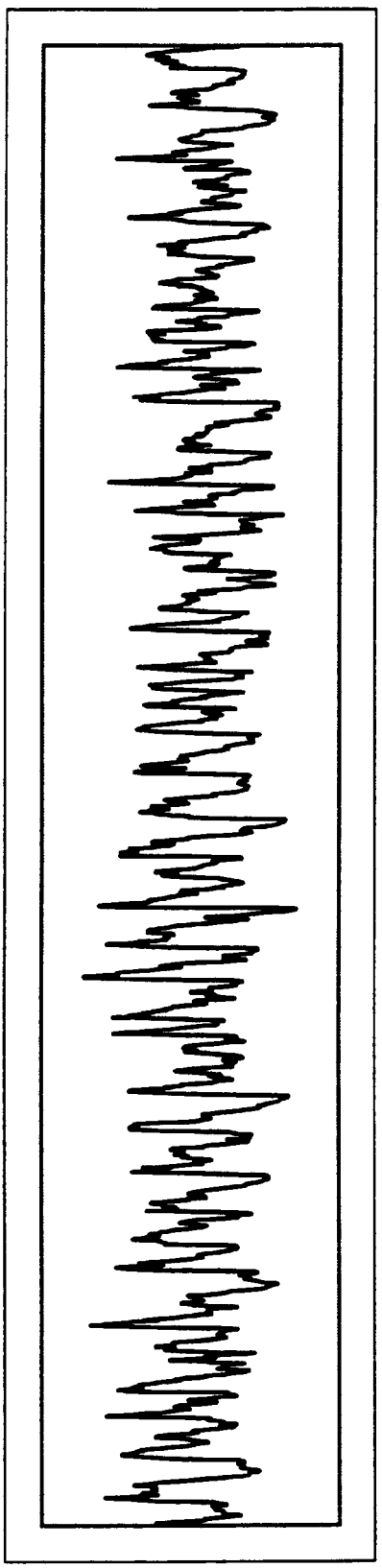
FIG. 2a and FIG. 2b are general representations for illustration purposes only of a first signal and a second signal respectively generated by pressure transducers according to a preferred embodiment of the invention.
Figure 2:
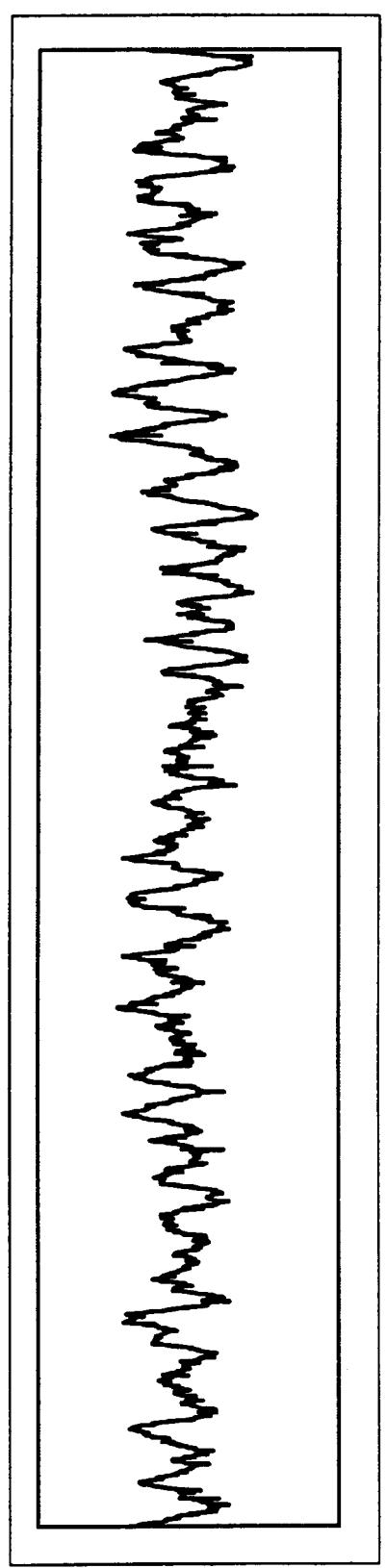
Figure 3:
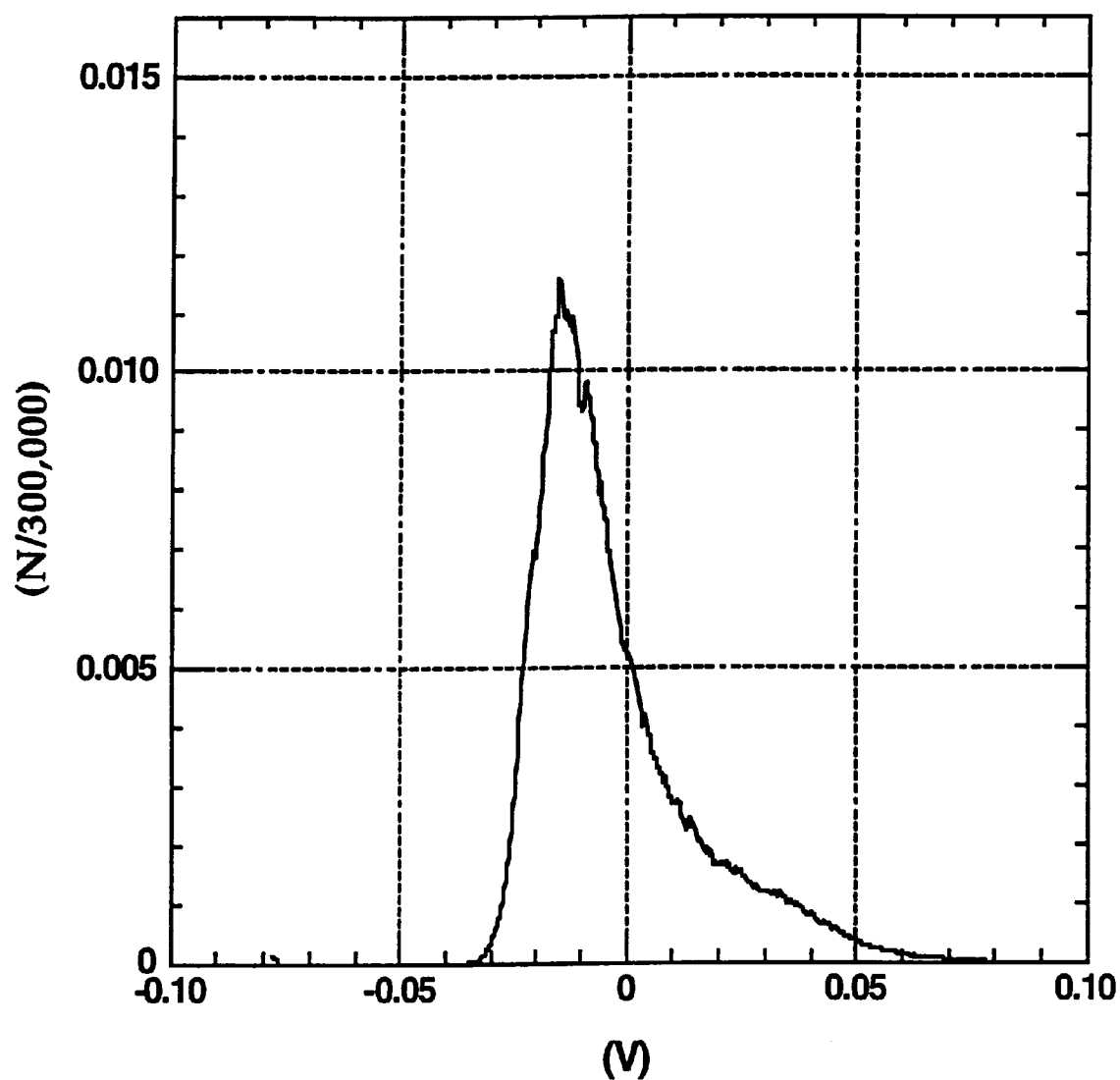
FIG. 3 is a general representation for illustration purposes only of a single modal probability density function developed from a signal according to a preferred embodiment of the invention.
Figure 4:
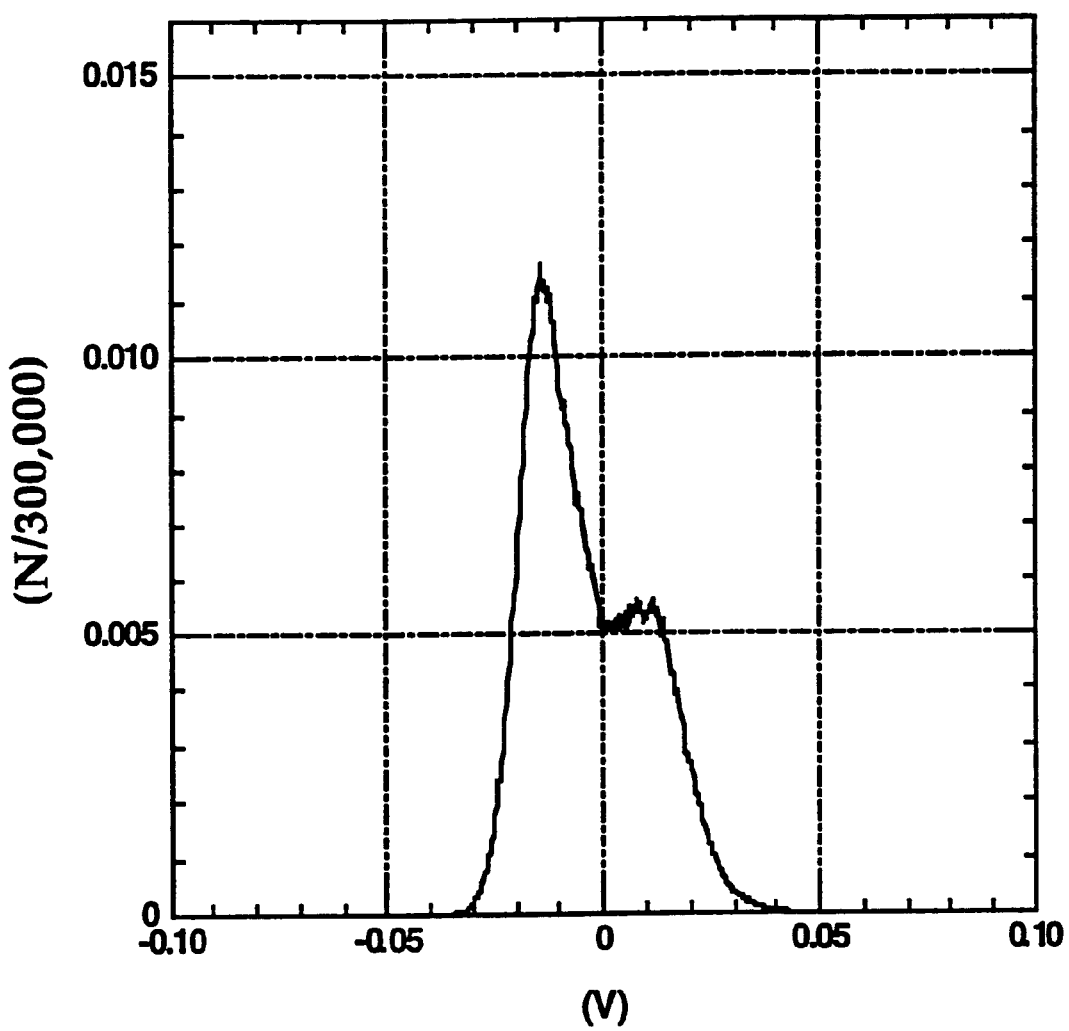
FIG. 4 is a general representation for illustration purposes only of a multi-modal probability density function developed from a signal according to a preferred embodiment of the invention.
Figure 5:
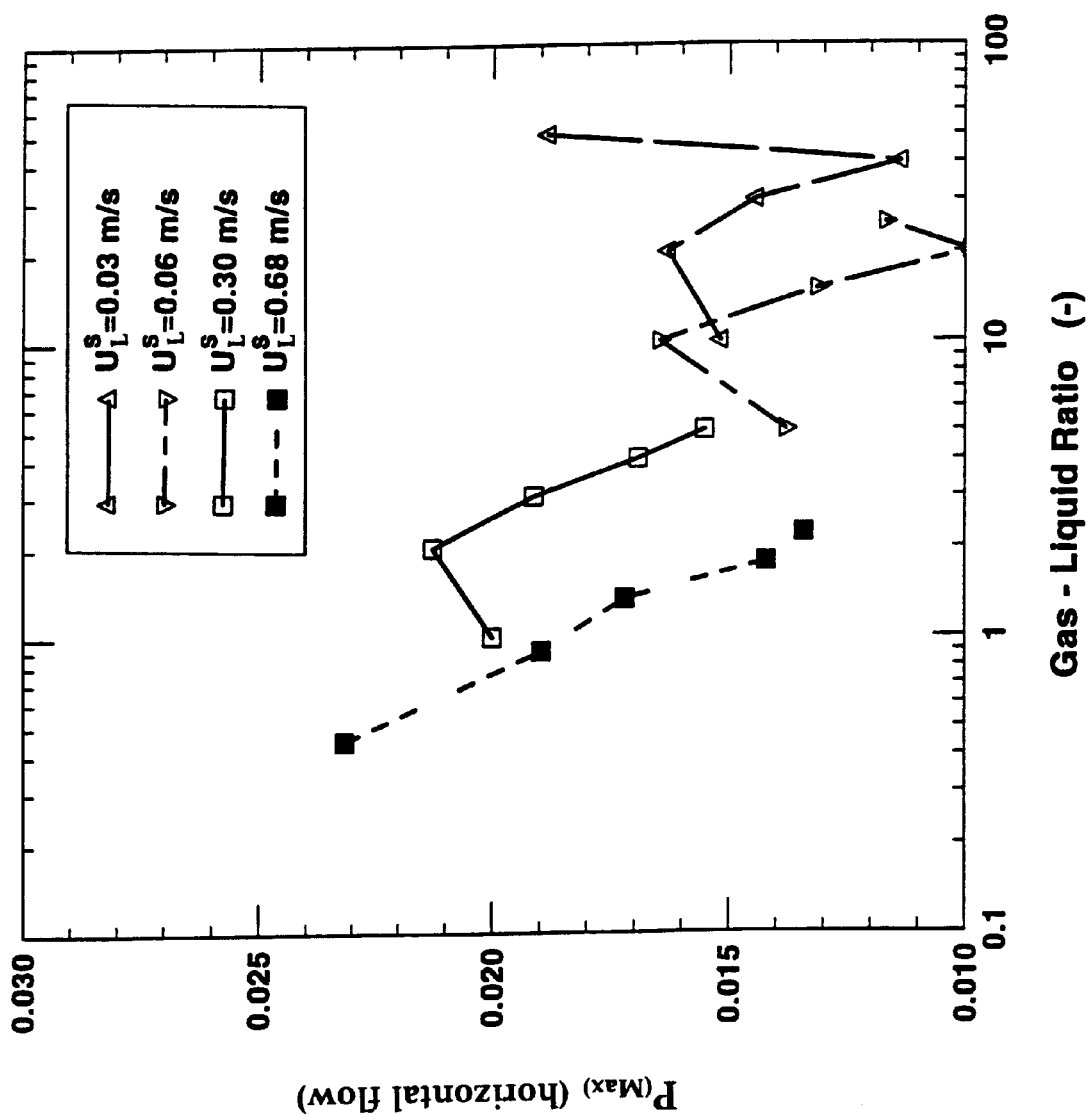
FIG. 5 is an example of a calibration graph prepared for use in the invention, in which gas to liquid ratio is expressed as a function of maximum probability density value ($P_{(max)}$) for a horizontal flow passage.
Figure 6:
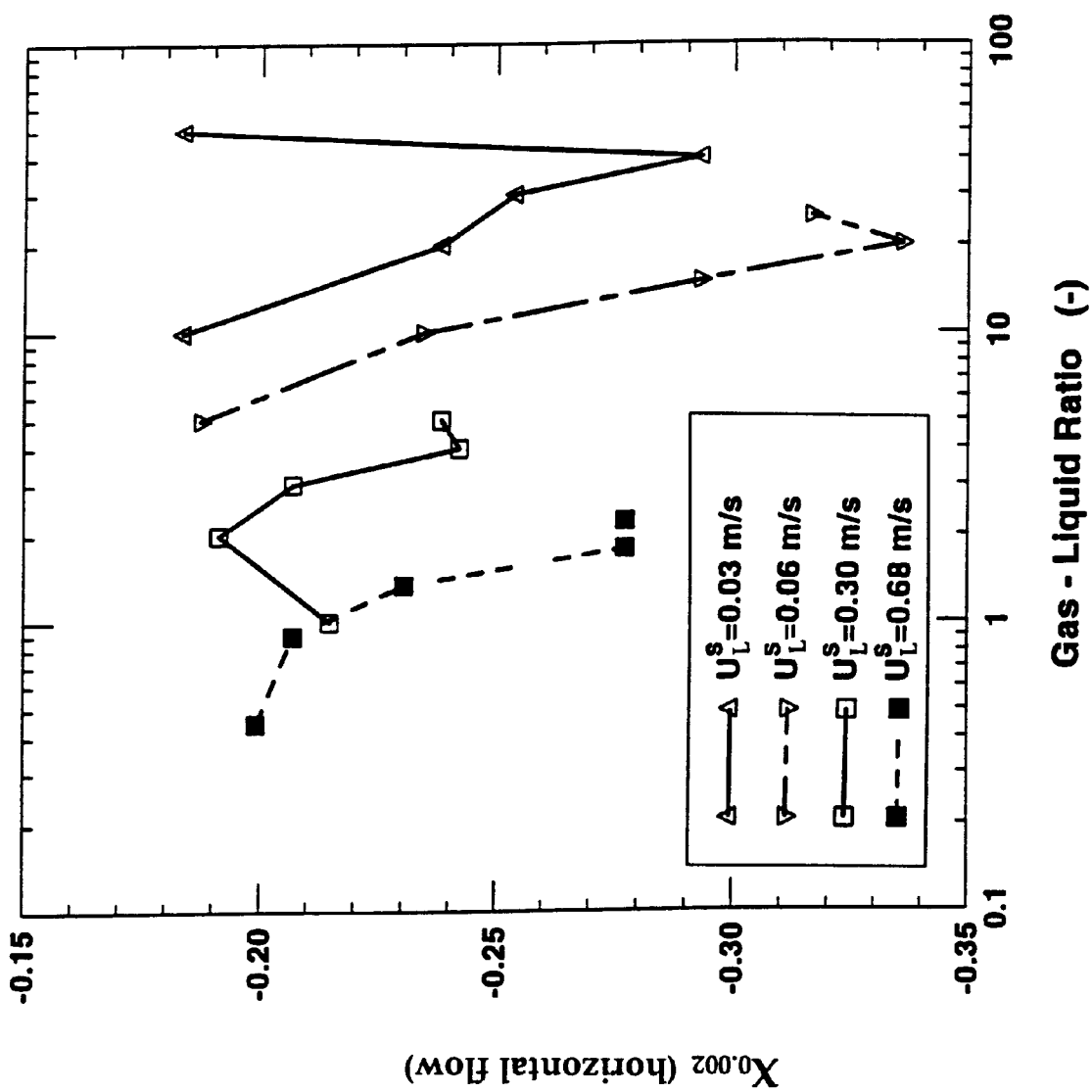
FIG. 6 is an example of a calibration graph prepared for use in the invention, in which gas to liquid ratio is expressed as a function of signal value at one location at a probability density of 0.002 ($X_{0.002}$) for a horizontal flow passage.
Figure 7:
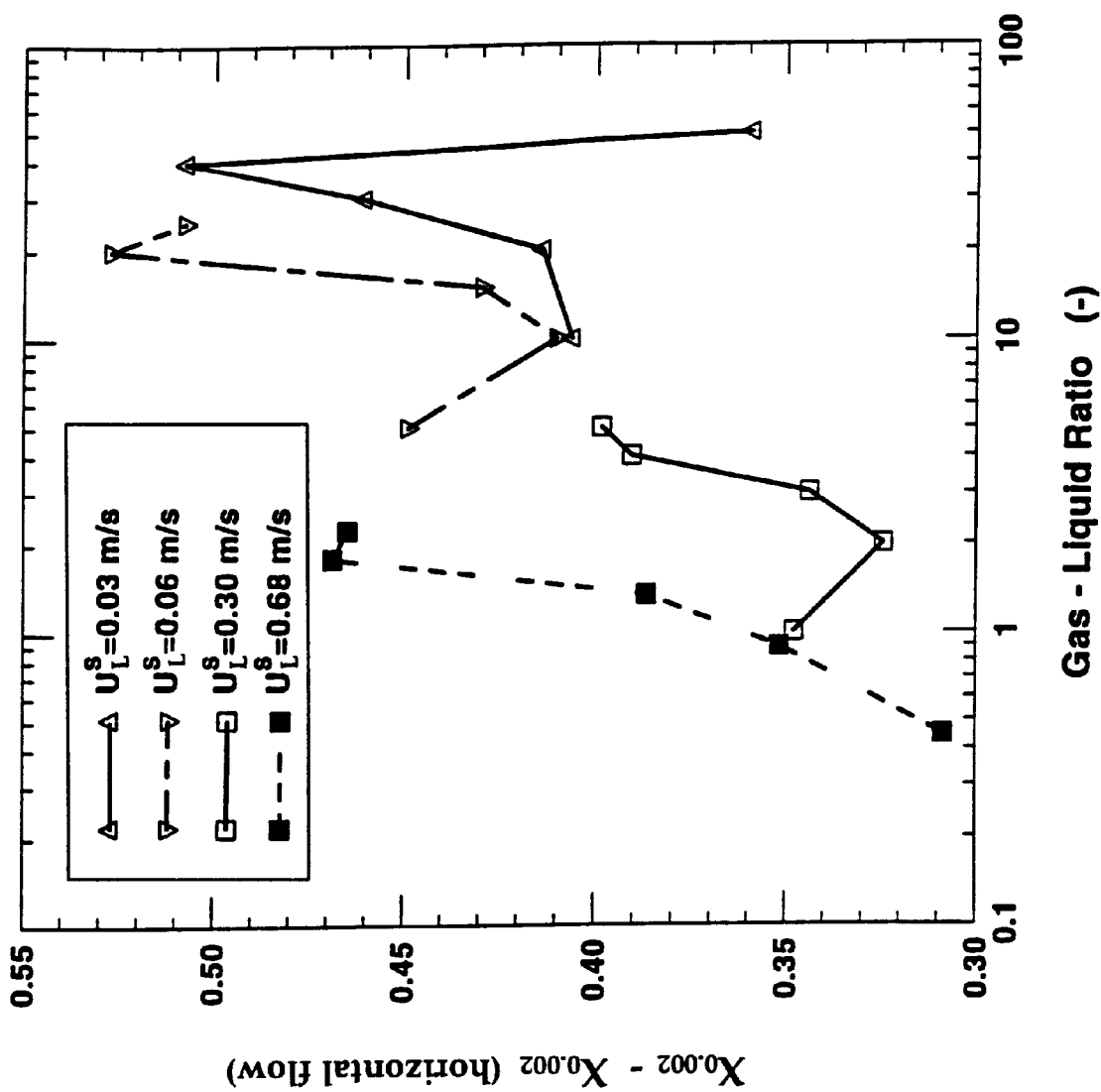
FIG. 7 is an example of a calibration graph prepared for use in the invention, in which gas to liquid ratio is expressed as a function of the difference in signal value between two locations at a probability of 0.002 ($X_{0.002}-X_{0.002}$) for a horizontal flow passage.
Figure 8:
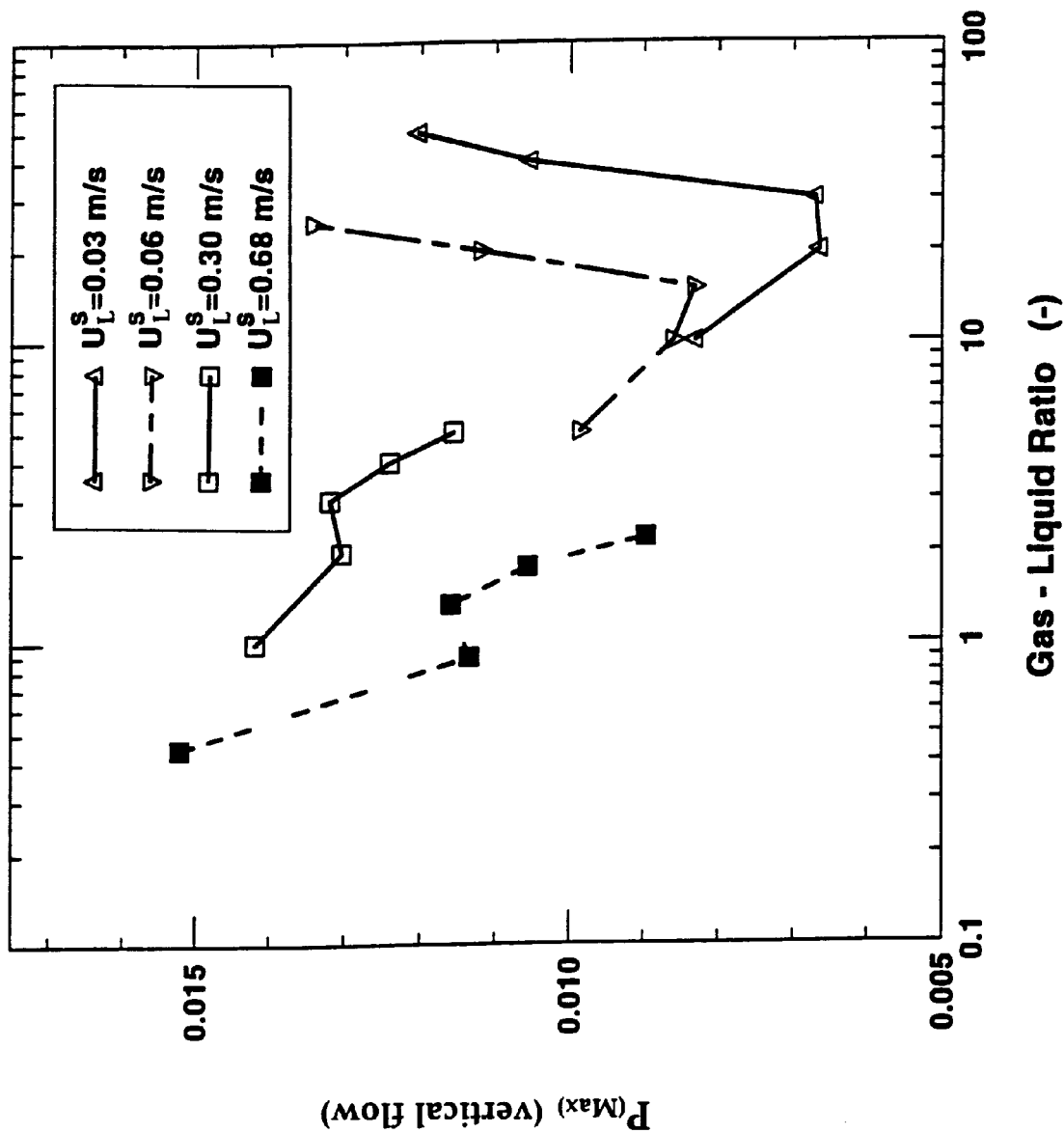
FIG. 8 is an example of a calibration graph prepared for use in the invention, in which gas to liquid ratio is expressed as a function of maximum probability density value ($P_{(max)}$) for a vertical flow passage.
Figure 9:
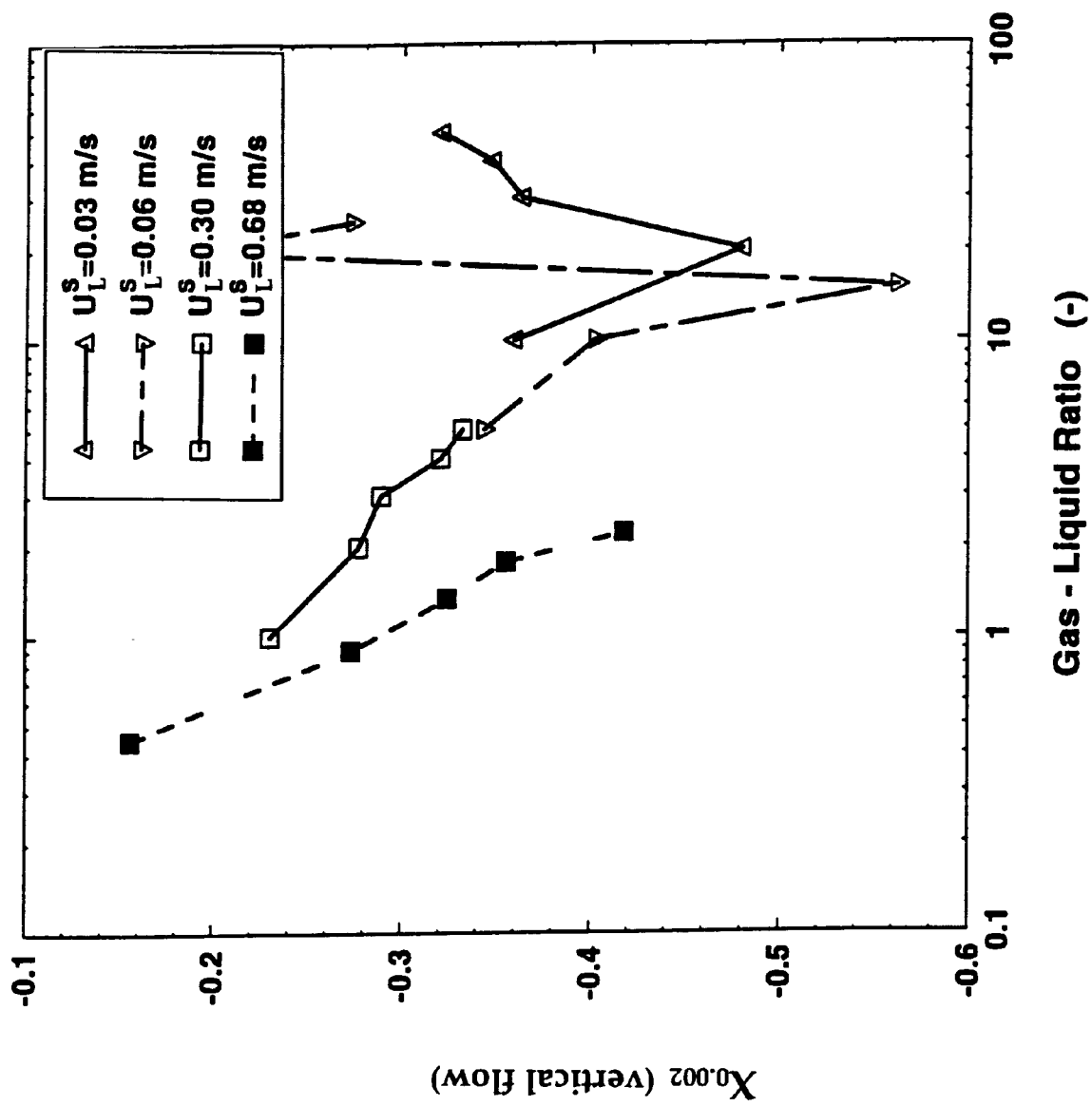
FIG. 9 is an example of a calibration graph prepared for use in the invention, in which gas to liquid ratio is expressed as a function of signal value at one location at a probability of density 0.002 ($X_{0.002}-X_{0.002}$) for a vertical flow passage.
Figure 10:
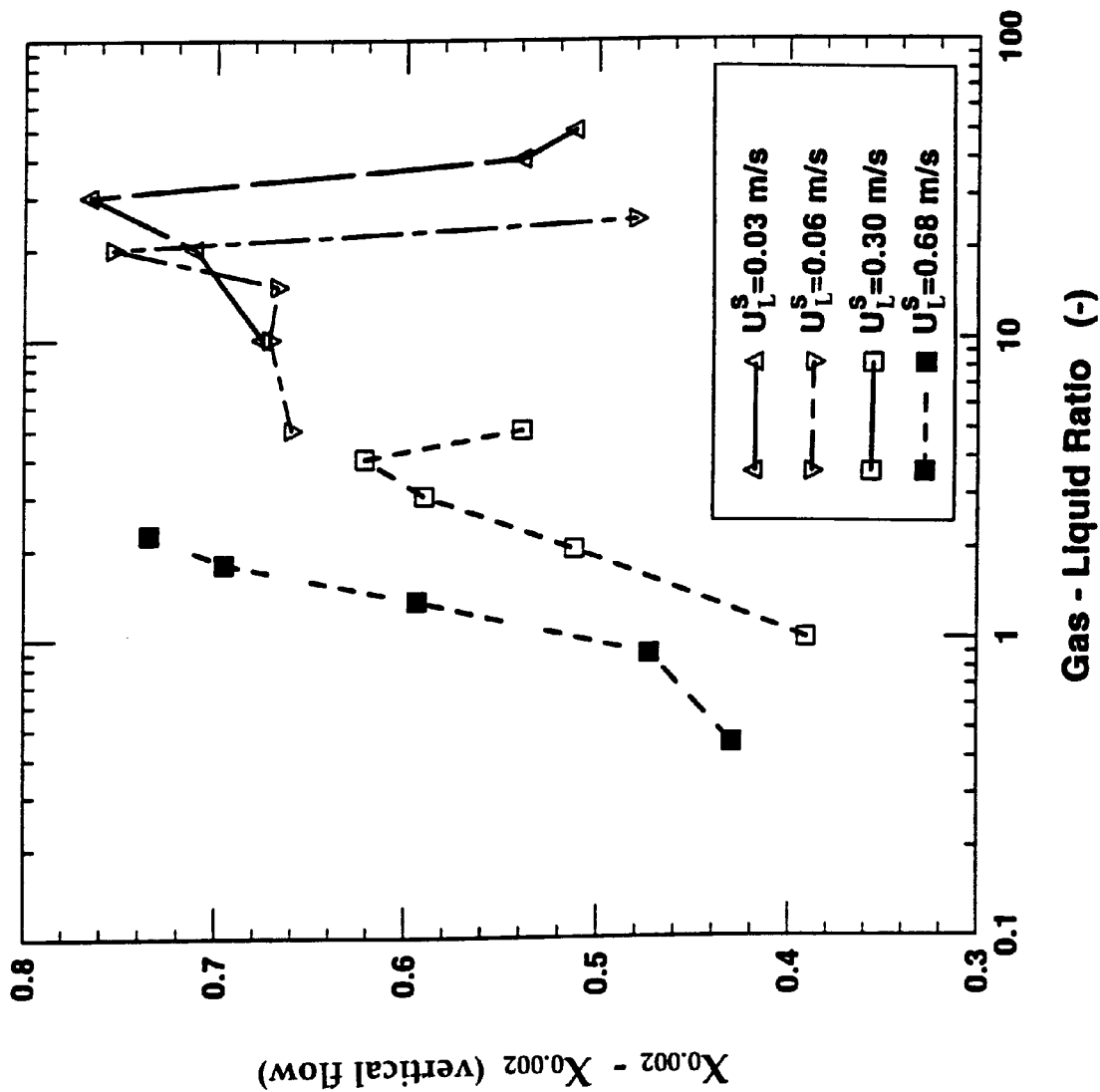
FIG. 10 is an example of a calibration graph prepared for use in the invention, in which gas to liquid ratio is expressed as a function of the difference in signal value between two locations at a probability density of 0.002 ($X_{0.002}-X_{0.002}$) for a vertical flow passage.

Referring to FIGS. 1 and 2, the apparatus form of the invention includes a first flow passage (20) for the multiphase fluid and a second flow passage (22) for the multiphase fluid. The second flow passage (22) has a different geometry from the first flow passage (20). This different geometry may relate to the cross section of the second flow passage (22) relative to the first flow passage (20), such as in terms of size or shape, or may relate to the direction in which the multiphase fluid passes through the flow passages (20, 22) relative to gravity. The purpose of providing a different geometry for the first flow passage (20) and the second flow passage (22) is to create different flow conditions and thus different phase patterns for the multiphase fluid in the two flow passages (20, 22).

In the preferred embodiment, the different geometry of the second flow passage (22) relative to the first flow passage

(20) relates to the direction in which the multiphase fluid passes through the flow passages (20, 22) relative to gravity. In particular, in the preferred embodiment, the multiphase fluid passes through one of the first flow passage (20) and the second flow passage (22) in a substantially vertical direction and passes through the other of the first flow passage (20) and the second flow passage (22) in a substantially horizontal direction. In the preferred embodiment depicted in FIG. 1, the first flow passage (20) is oriented in a substantially horizontal direction and the second flow passage (22) is oriented in a substantially vertical direction.

The first flow passage (20) and the second flow passage (22) may, however, be separated relative to gravity by other than ninety degrees. For example, the flow passages (20, 22) may be oriented less than ninety degrees apart relative to gravity or may even be parallel to each other if the multiphase fluid flows in opposite directions relative to gravity in the two flow passages (20, 22).

The purpose of the invention is to determine at least one property of the multiphase fluid. In the preferred embodiment, the property to be determined is the relative proportions of gas phase and liquid phase which are present in the multiphase fluid, and is expressed as the gas to liquid ratio of the multiphase fluid. The invention may, however, be used to determine other or additional properties of the multiphase fluid. For example, the flow of the multiphase fluid may be more fully characterized by the utilization (as in a preferred embodiment of the method aspect of the invention) of the superficial liquid velocity of the multiphase fluid as a second property to assist in identifying the gas to liquid ratio of the multiphase fluid.

In the preferred embodiment, the first flow passage (20) is a closed conduit and terminates with a first elbow (24) and the second flow passage (22) is a closed conduit and terminates with a second elbow (26). Referring to FIG. 1, the first elbow (24) is a ninety degree elbow and connects the first flow passage (20) with the second flow passage (22) and the second elbow (26) is a ninety degree elbow and connects the second flow passage (22) with a third flow passage (28) to form a three sided measuring loop (29).

A first monitoring device (30) is positioned at the first elbow (24) and is in communication with the first flow passage (20) so that a first signal can be obtained which represents a first flow characteristic of the multiphase fluid as a function of time. Similarly, a second monitoring device (32) is positioned at the second elbow (26) and is in communication with the second flow passage (22) so that a second signal can be obtained which represents a second flow characteristic of the multiphase fluid as a function of time.

The first monitoring device (30) may be comprised of any device such as a first transducer which is capable of providing a first signal representing a first flow characteristic of the multiphase fluid as a function of time and the second monitoring device (32) may be comprised of any device such as a second transducer which is capable of providing a second signal representing a second flow characteristic of the multiphase fluid as a function of time. The signals are preferably electrical in nature but may also be pressure signals, force signals or any other type of signal which can be expressed as a function of time and which provides suitable responsiveness to variation in the flow characteristic which is being monitored by the monitoring device (30, 32).

In the preferred embodiment, the first monitoring device (30) is a first pressure transducer which generates a first electrical signal which represents variations in a first pressure exerted by the multiphase fluid in the vicinity of the first elbow (24) as a function of time. Similarly, in the preferred embodiment, the second monitoring device (32) is a second pressure transducer which generates a second electrical signal which represents variations in a second pressure exerted by the multiphase fluid in the vicinity of the second elbow (24) as a function of time. The first pressure and the second pressure are directly related to the density and the acceleration of the multiphase fluid caused by the first elbow (24) and the second elbow (26) respectively. The first monitoring device (30) and the second monitoring device (32) are preferably pointed directly facing the incoming flow of multiphase fluid, but may also be oriented in some other direction.

In a preferred embodiment, the monitoring devices (30, 32) are both acceleration compensated pressure transducers, such as Series 211B Piezotron™ pressure transducers which are manufactured by Kistler Instrument Corporation. These acceleration compensated pressure transducers feature a high natural frequency and low impedance. The Model 211B4 Piezotron™ pressure transducer has been found to be particularly suitable for use in the invention, and features a pressure range of 200 p.s.i., a linearity response of less than or equal to ±1%, a threshold of 0.002 p.s.i./rms and a resonant frequency of 500 kHz. Other transducers may be utilized as the monitoring devices (30, 32) as long as they provide a suitable pressure range and responsiveness to permit accurate monitoring of the multiphase fluid in the first flow passage (20) and the second flow passage (22).

In the preferred embodiment, the cross sectional areas and the lengths of the flow passages (20, 22) are chosen so that the multiphase fluid exhibits stable or pseudo-stable flow (i.e. well developed phase pattern) in the vicinity of the monitoring devices (30, 32) over the entire range of flow-rates of the multiphase fluid which are to be passed through the flow passages (20, 22). The cross sectional areas and lengths of the first flow passage (20) and the second flow passage (22) may be the same as each other or they may be different. In a preferred embodiment in which the invention is used in conjunction with a closed main conduit (not shown) which transports the multiphase fluid between two locations, the inside diameters of the first flow passage (20) and the second flow passage (22) are preferably the same as that of the main conduit in order to minimize disruption of the multiphase fluid low during monitoring.

In the preferred embodiment, the first pressure is converted to a first electrical signal and recorded for further processing using means for recording the first signal (34), and the second pressure is converted to a second electrical signal and recorded for further processing using means for recording the second signal (36). The first electrical signal is preferably converted to a first set of data points using means for processing the first signal (38), and the second electrical signal is converted to a second set of data points using means for processing the second signal (40). In applications of the invention where noise and interference are likely to be a problem, the first electrical signal and the second electrical signal are preferably preliminarily processed before creation of the sets of data points to eliminate noise and interference from them. This preliminary processing may include filtering using power spectral distribution (PSD) techniques. The signals may also be preliminarily processed before creation of the sets of data points to eliminate low frequency variations in the signals such as may be caused by the cycling of pumps etc.

In the preferred embodiment, the means for recording (34, 36) and the means for processing (38, 40) comprise a single data logger. Separate means could however be employed for each function and for each signal.

The data logger converts each of the signals into a separate voltage signal. The sets of data points are then generated by dividing the range of magnitude of the voltage signals into a number of discrete bands and sampling the voltage signals at a frequency sufficient to generate a representative number of data points in a reasonable period of time. Each data point can then be grouped according to the band in which the voltage signal falls in order to facilitate the development of the probability density functions.

In the preferred embodiment, the data logger operates at about 2000 Hz and the signals are sampled for a sufficient period of time to generate about 300,000 data points for each signal. The range of values for the voltage signals is separated into 512 bands with each band representing a different value for the voltage signal. The first set of data points is then used to develop a first probability density function and the second set of data points is used to develop a second probability density function. In both probability density functions, the value of the voltage signal is represented by one axis and the probability density of a particular voltage signal value is represented by the other axis.

Systems, means for recording (34, 36) and means for processing (38, 40) other than a data logger as described above may be utilized in the invention. For example, it may not be necessary for the means for recording (34, 36) to record directly either the pressure signal or the electrical signal as long as the data points which are generated therefrom are recorded for further analysis. In addition, the processing of the signals may be performed manually or by using a combination of means for processing (38, 40) and manual techniques. Finally, it may not be necessary to process the signals at all if they can be recorded and then used directly to determine the property of the multiphase fluid, and the signals may also be processed other than by creating data points from them, as long as the processing yields parameters that can be used to determine the property of the multiphase fluid.

A number of parameters may be obtained from the first probability density function and the second probability density function. These parameters may be used to determine the property of the multiphase fluid which is sought to be determined. In the preferred embodiment, at least a first parameter obtained from the first probability density function (and thus the first signal) and a second parameter obtained from the second probability density function (and thus the second signal) are used. It may be desirable in some applications to use more than two parameters in order to determine the property of the multiphase fluid with greater certainty than is possible by using only two parameters. For example, a third parameter may be derived from the first signal, a fourth parameter may be derived from the second signal, and so on.

In the preferred embodiment, the first parameter, the second parameter, the third parameter, the fourth parameter and so on are in the nature of statistical parameters and relate to the features of the probability density functions. These parameters may be a measure of the maximum probability density value in the probability density function ($P_{(max)}$), the value of the signal corresponding to a predetermined probability density ($X_{P1}$), the corresponding difference in the value of the signal between two predetermined probability densities ($X_{P2}-X_{P1}$), minimum signal value, maximum signal value, mean signal value, median signal value, standard deviation of the probability density function, skewness of the probability density function, kurtosis of the probability density function, momentum of the probability density function, or of any other statistical parameter that can be obtained from the probability density functions, including frequency related parameters such as linear prediction model parameters and cepstrum function parameters. Where the probability density function yields a multi-modal distribution, the parameters are preferably selected to be reflective of the multi-modal distribution. For example, in a multi-modal distribution there may be more than one possible value for $P_{(max)}$, which may necessitate the use of all such possible values as parameters.

It has been found that the most preferred parameters include the maximum probability density value in the probability density function ($P_{(max)}$), the value of the signal corresponding to a predetermined probability density ($X_{P1}$) and the corresponding difference in the value of the signal between two predetermined probability densities ($X_{P2-XP1}$). The same parameters are preferably chosen for each signal and thus each probability density function, but different parameters may also be chosen.

In the method form of the invention, the property of the multiphase fluid is determined by comparing the value of at least the first parameter and the second parameter with a set of calibration maps which relate the parameters to the property to be determined.

In the preferred embodiment, the set of calibration maps comprises a separate graph for each of the parameters to be utilized, in which the value of the property to be determined is along one axis of the graph and the value of the parameter is along the other axis of the graph. Each calibration graph further comprises a series of plots of the property to be determined against the parameter with each plot being for a single value of a second property of the multiphase fluid. In the preferred embodiment, the second property is the superficial liquid velocity of the multiphase fluid.

Referring to FIGS. 5 through 10, in the preferred embodiment each calibration graph depicts the value of the parameter on the vertical axis and the gas to liquid ratio of the multiphase fluid on the horizontal axis. Superimposed on these axes is a series of four separate plots representing the value of the parameter against the gas to liquid ratio of the multiphase fluid for values of the superficial liquid velocity of the multiphase fluid of 0.03 meters per second, 0.06 meters per second, 0.30 meters per second and 0.68 meters per second, where the superficial liquid velocity of the multiphase fluid is equal to the volumetric flow rate of the liquid phase of the multiphase fluid divided by the cross sectional area of the first flow passage (20) or the second flow passage (22), as the case may be. The number of plots on each calibration graph are preferably maximized to assist in interpolating between plotted values of the superficial liquid velocity.

The value of the gas to liquid ratio of the multiphase fluid is thus determined by identifying on at least two calibration graphs a common value for the gas to liquid ratio and the superficial liquid velocity which is compatible with the values of the parameters. Once the value of the gas to liquid ratio of the multiphase fluid has been determined, it may be used with the value for the superficial liquid velocity to more fully characterize the flow of the multiphase fluid.

In the most simple form of the preferred embodiment, the value of the gas to liquid ratio of a multiphase fluid is determined by using only the first parameter and the second parameter. In certain applications, however, where it is difficult to identify a common value for the gas to liquid ratio and the superficial liquid velocity of the multiphase fluid which is compatible with the values of the first parameter and the second parameter, additional parameters such as the third parameter and fourth parameter may be used to increase the accuracy of the method of the invention.

In addition, or in the alternative, the calibration graphs may include plots of the various parameters against gas to liquid ratio for single values of properties in addition to the second property, such as a third property, a fourth property, and so on. The value of the gas to liquid ratio of the multiphase fluid may then be determined by identifying on at least two calibration graphs a common value for the gas to liquid ratio which is compatible with the values of the parameters and with the second property and any other additional properties for which plots have been made. This may further increase the accuracy of the method, and these additional properties may assist in more fully characterizing the flow of the multiphase fluid.

The calibration maps may be created by passing a multiphase fluid through the first flow passage (20) and the second flow passage (22) and deriving values for the various parameters in circumstances where values for various properties of the multiphase fluid are known, including the property to be determined and the second property and if applicable, the third property, the fourth property and so on. Separate data points representing the value of a particular parameter at varying known values of the properties can then be obtained and the plots on the calibration graphs can be produced.

Referring to FIG. 1, the measuring loop depicted therein includes apparatus for use in developing a set of calibration maps for use in the invention. A liquid source (42) is provided for delivering liquid phase fluids to a liquid inlet (44) in the first flow passage (20). The rate of delivery of liquid phase fluids to the first flow passage (20) by the liquid source (42) is controllable to permit control over the superficial liquid velocity of the fluid passing through the first flow passage (20) and the second flow passage (22). A gas source (46) is also provided for delivering gas phase fluids to a gas inlet (48) in the first flow passage (20). The rate of delivery of gas phase fluids to the first flow passage (20) by the gas source (46) is also controllable to permit control over the superficial gas velocity of the fluid passing through the first flow passage (20) and the second flow passage (22). Additional fluid sources may be provided in circumstances where it is desirable to pass more than two phases of fluid through the flow passages (20, 22).

The liquid source (42) and the gas source (46) are used to deliver multiphase fluids having known properties to the flow passages (20, 22) so that the monitoring devices (30, 32) can generate signals from which parameters can be derived and calibration graphs can be created. Once the calibration graphs have been prepared, the liquid source (42) and the gas source (46) may be substituted with a multiphase fluid source (not shown) to facilitate the monitoring of a multiphase fluid to determine a property associated therewith using the method of the invention.

The embodiments of the invention in which an exclusive property or privilege is claimed are defined as follows:

1. A method for determining a property of a multiphase fluid, comprising the following steps:
    (a) directing the multiphase fluid through a first flow passage, wherein the first flow passage includes a first elbow for chancing the direction of the multiphase fluid;
    (b) monitoring the multiphase fluid with a first pressure transducer in communication with the first flow passage and positioned at the first elbow as the multiphase fluid passes through the first elbow, to obtain a first signal representing a variation in a first pressure as a function of time;
    (c) directing the multiphase fluid through a second flow passage, wherein the second flow passage includes a second elbow for changing the direction of the multiphase fluid and wherein the multiphase fluid passes through the first flow passage and the second flow passage in different directions relative to gravity;
    (d) monitoring the multiphase fluid with a second pressure transducer in communication with the second flow passage and positioned at the second elbow as the multiphase fluid passes through the second elbow, to obtain a second signal representing a variation in a second pressure as a function of time; and
    (e) determining the property of the multiphase fluid by comparing the first signal and the second signal with a set of calibration maps.

2. The method as claimed in claim 1 wherein the multiphase fluid comprises a gas phase and a liquid phase and wherein the property of the multiphase fluid to be determined is a measure of the relative proportions of the gas phase and the liquid phase contained in the multiphase fluid.

3. The method as claimed in claim 1 wherein the multiphase fluid comprises a gas phase and a liquid phase and wherein the property of the multiphase fluid to be determined is a superficial velocity of either the gas phase or the liquid phase.

4. The method as claimed in claim 1 further comprising the steps of deriving a value for a first parameter from the first signal and deriving a value for a second parameter from the second signal and wherein the property determining step comprises comparing the values of the first parameter and the second parameter with the set of calibration maps.

5. The method as claimed in claim 4 wherein the step of deriving a value for a first parameter from the first signal comprises the steps of creating a first set of data points from the first signal, developing a first probability density function of the first signal, and obtaining the value for the first parameter from the first probability density function.

6. The method as claimed in claim 5 wherein the step of deriving a value for a second parameter from the second signal comprises the steps of creating a second set of data points from the second signal, developing a second probability density function of the second signal, and obtaining the value of the second parameter from the second probability density function.

7. The method as claimed in claim 6 wherein the first parameter is selected from a group of parameters consisting of $P1_{(max)}$, $(X1_{P12}-X1_{P11})$ and $X1_{P11}$, wherein:
    $P_{(max)}$=a maximum value of probability density in the first probability density function;
    $X1_{P12}$=a value of the first signal at a probability density of P12 in the first probability density function;
    $X1_{P11}$=a value of the first signal at a probability density of P11 in the first probability density function.

8. The method as claimed in claim 7 wherein the second parameter is selected from a group of parameters consisting of $P2_{(max)}$, $(X2_{P22}-X2_{P21})$ and $X2_{P21}$, wherein:
    $P2_{(max)}$=a maximum value of probability density in the second probability density function;
    $X2_{P22}$=a value of the second signal at a probability density of P22 in the second probability density function;
    $X2_{P21}$=a value of the second signal at a probability density of P21 in the second probability density function.

9. The method as claimed in claim 8 wherein the set of calibration maps comprises at least one map of the first parameter as a function of the property and at least one map of the second parameter as a function of the property.

10. The method as claimed in claim 9 wherein the multiphase fluid passes through one of the first flow passage and the second flow passage in a substantially vertical direction and wherein the multiphase fluid passes through the other of the first flow passage and the second flow passage in a substantially horizontal direction.

11. The method as claimed in claim 10 wherein the first signal is a first electrical signal generated by the first transducer and wherein the second signal is a second electrical signal generated by the second transducer.

12. The method as claimed in claim 9 further comprising the steps of obtaining a value for a third parameter from the first probability density function and determining the property of the multiphase fluid by comparing the values of the first parameter, the second parameter and the third parameter with a set of calibration maps.

13. The method as claimed in claim 12 further comprising the steps of obtaining a value for a fourth parameter from the second probability density function and determining the property of the multiphase fluid by comparing the values of the first parameter, the second parameter, the third parameter and the fourth parameter with a set of calibration maps.

14. The method as claimed in claim 13 wherein the third parameter is selected from a group of parameters consisting of $P1_{(max)}$, $(X1_{P32}-X1_{P31})$ and $X1_{P31}$, wherein:

$P1_{(max)}$=a maximum value of probability density in the first probability density function;

$X1_{P32}$=a value of the first signal at a probability density of P32 in the first probability density function;

$X1_{P31}$=a value of the first signal at a probability density of P31 in the first probability density function.

15. The method as claimed in claim 14 wherein the fourth parameter is selected from a group of parameters consisting of $P2_{(max)}$, $(X2_{P42}-X2_{P41})$ and $X2_{P41}$, wherein:

$P2_{(max)}$=a maximum value of probability density in the second probability density function;

$X2_{P42}$=a value of the second signal at a probability density of P42 in the second probability density function;

$X2_{P41}$=a value of the second signal at a probability density of P41 in the second probability density function.

16. The method as claimed in claim 15 wherein the set of calibration maps further comprise at least one map of the third parameter as a function of the property and at least one map of the fourth parameter as a function of the property.

17. An apparatus for use in determining a property of a multiphase fluid comprising:

(a) a first flow passage for the multiphase fluid, wherein the first flow passage includes a first elbow for changing the direction of the multiphase fluid;

(b) a first pressure transducer in communication with the first flow passage and positioned at the first elbow for obtaining a first signal representing a variation in a first pressure as a function of time;

(c) a second flow passage for the multiphase fluid oriented such that the multiphase fluid passes through the first flow passage and the second flow passage in different directions relative to gravity, wherein the second flow passage includes a second elbow for changing the direction of the multiphase fluid; and (d) a second pressure transducer in communication with the second flow passage and positioned at the second elbow for obtaining a second signal representing a variation in a second pressure as a function of time.

18. The apparatus as claimed in claim 17 wherein the first signal is a first electrical signal generated by the first transducer and wherein the second signal is a second electrical signal generated by the second transducer.

19. The apparatus as claimed in claim 18 further comprising means for recording the first signal for further processing and further comprising means for recording the second signal for further processing.

20. The apparatus as claimed in claim 19 further comprising means for processing the first signal to facilitate the derivation from the first signal of a first parameter.

21. The apparatus as claimed in claim 20 further comprising means for processing the second signal to facilitate the derivation from the second signal of a second parameter.

22. The apparatus as claimed in claim 17 wherein the first flow passage is connected to the second flow passage by the first elbow or by the second elbow.

23. The apparatus as claimed in claim 22 further comprising a third flow passage for the multiphase fluid, wherein the first flow passage, the second flow passage and the third flow passage are connected to each other by the first elbow and the second elbow to form a measuring loop.

24. The apparatus as claimed in claim 23 wherein the first elbow is substantially a ninety degree elbow and wherein the second elbow is substantially a ninety degree elbow.

25. The apparatus as claimed in claim 24 wherein the first flow passage is a first closed conduit, wherein the second flow passage is a second closed conduit, and wherein the third flow passage is a third closed conduit.

26. The apparatus as claimed in claim 17 wherein the first flow passage and the second flow passage are oriented so that the multiphase fluid passes through one of the first flow passage and the second flow passage in a substantially vertical direction and the multiphase fluid passes through the other of the first flow passage and the second flow passage in a substantially horizontal direction.

* * * * *